United States Patent [19]

Wheelock

[11] Patent Number: 4,625,704

[45] Date of Patent: Dec. 2, 1986

[54] ELECTRONIC IGNITION SYSTEM

[75] Inventor: James G. Wheelock, Montrose, Ala.

[73] Assignee: Teledyne Industries, Inc., Los Angeles, Calif.

[21] Appl. No.: 750,417

[22] Filed: Jun. 28, 1985

[51] Int. Cl.⁴ .............................................. F02P 5/00
[52] U.S. Cl. ................................... 123/611; 123/610; 123/609
[58] Field of Search ........................ 123/611, 610, 609

[56] References Cited

U.S. PATENT DOCUMENTS

| | | | |
|---|---|---|---|
| 3,854,465 | 12/1974 | Adams | 123/610 |
| 3,871,347 | 3/1975 | Weber | 123/611 |
| 3,937,193 | 2/1976 | Kim | 123/611 |
| 4,019,484 | 4/1977 | Mori | 123/611 |
| 4,041,912 | 8/1977 | Sessions | 123/611 |
| 4,082,075 | 4/1978 | Davis | 123/611 |
| 4,128,091 | 12/1978 | Bahan et al. | 123/611 |
| 4,212,280 | 7/1980 | Frasow et al. | 123/611 |
| 4,245,600 | 1/1981 | Katada | 123/611 |
| 4,300,874 | 11/1982 | Ohba et al. | 123/610 |
| 4,309,973 | 1/1982 | Tamura | 123/611 |

Primary Examiner—Raymond A. Nelli
Attorney, Agent, or Firm—Gifford, Groh, VanOphem, Sheridan, Sprinkle & Dolgorukov

[57] ABSTRACT

An electronic ignition system for a reciprocal piston, spark ignition internal combustion engine includes sensors which generate output signals representative of the rotational position and speed of the engine output shaft. A computer responsive to the sensor inputs generates an output signal which electrically connects a source of electrical energy to the primary coil of an ignition transformer for a predetermined period of time prior to the desired energization of the spark plug regardless of the rotational speed of the engine output shaft, but dependent on the voltage of the source of electrical energy. Initiation of the predetermined period is dependent on a manually set spark advance.

6 Claims, 7 Drawing Figures

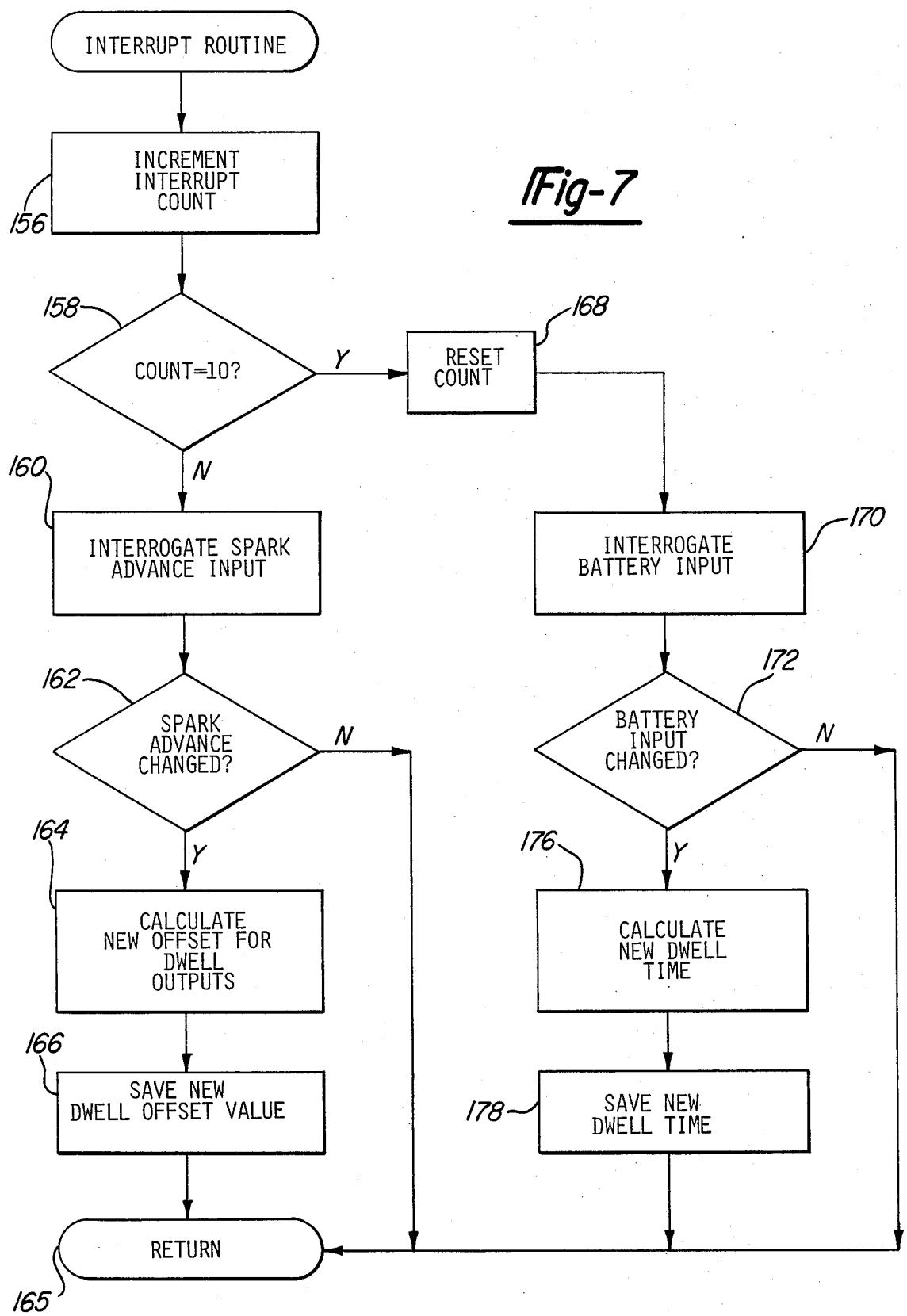

ELECTRONIC IGNITION SYSTEM

BACKGROUND OF THE INVENTION

I. Field of the Invention

The present invention relates generally to ignition systems for spark ignition reciprocal piston internal combustion engines and, more particularly, to an electronic ignition system.

II. Description of the Prior Art

Reciprocal piston internal combustion engines comprise at least one cylinder in which a piston is reciprocally slidably mounted. The piston is connected by a connecting rod to a crank shaft so that reciprocation of the piston within the cylinder rotatably drives the crank shaft.

A combustible gaseous mixture is supplied to the cylinder during the intake stroke of the piston and this gaseous mixture is then compressed by the piston during the compression stroke. A spark plug is activated or energized at or near the end of the compression stroke which ignites the gaseous mixture. The expansion of the gaseous mixture following combustion drives the piston from the cylinder head and towards the crank shaft thus rotatably driving the crank shaft in the desired fashion. In a four cycle engine, the next outward reciprocation of the piston within the cylinder exhausts the combustion products from the cylinder and the above cycle is then repeated.

In order to provide the proper timing for activation of the spark plug, many of the previously known systems have employed a distributor having a distributor shaft which is rotatably mounted in synchronism with the engine crank shaft. A cam is mounted to the distributor shaft while electrical contact points cooperate with the cam. Thus, upon rotation of the distributor shaft, the points make and break an electrical contact for each desired activation of the spark plug or spark plugs for a multi-piston and cylinder engine.

When the electrical contacts make a connection, the primary coil of an ignition transformer is electrically connected to a source of electrical energy which temporarily stores electrical energy in a magnetic field. The secondary coil of the transformer is connected to the spark plug so that, when the points break the electrical connection between the primary coil and the power source, the energy stored in the primary coil induces current in the secondary coil which discharges through the spark plug thus activating or energizing the spark plug. When energized, the spark plug sparks and ignites the fuel mixture within the cylinder.

These previously known distributor ignition systems all suffer from a number of common disadvantages. One disadvantage of such systems is that the mechanical components are subject to wear and tear and require frequent maintenance and replacement. Such systems are also expensive in construction and are also heavy in weight thus rendering them undesirable for weight critical applications, such as aircraft engines.

There have, however, been a number of previously known electronic ignition systems which replace the previously known distributors, distributor cams, contact points and their associated components. The previously known electronic ignition systems typically comprise a microprocessor which receives an input signal from the engine representative of the engine crankshaft position. The microprocessor then calculates the optimal time for activation of the various spark plugs within the engine as a function of the crankshaft position. The microprocessor then generates output signals which turn on electronic switches to electrically connect the primary coil of the transformer to a power source prior to the desired activation of the spark plug. At the desired activation of the spark plug, the microprocessor opens the electronic switch so that the stored energy in the primary coil of the transformer discharges through the secondary coil into the spark plug thus activating the sparkplug in the desired fashion. The microprocessor is also typically programmed to advance the fuel ignition before top dead center as the engine speed increases.

One disadvantage of these previously known electronic ignition systems, however, is that the microprocessor utilizes the rotational position of the crank shaft to determine the point at which the primary coil of the ignition transformer is connected to the power source. Consequently, the duration of the "dwell" period, i.e. the period during which the primary coil of the ignition transformer is electrically connected to the power source, varies as a function of engine speed. At higher speeds, the dwell period is much shorter than at lower speeds. Consequently, in order to ensure that the primary coil of the transformer receives a sufficient amount of electrical power to fire the spark plug at high engine speeds, it is necessary that the dwell period encompasses a relatively large crank angle of the crank shaft. This in turn reults in an excessively large dwell period for low engine speeds which wastes electrical power by creating large current drains. Such large current drains require larger storage batteries thereby increasing the weight of the ignition system.

A still further disadvantage of these previously known electronic ignition systems is that, in many applications, the electrical power source does not remain constant but, rather, varies between an upper and a lower limit. Since these previously known systems employ only the rotational position of the crank shaft to begin the dwell period, a relatively low battery voltage results in an insufficient supply of electrical energy to the primary coil of the transformer, particularly at high engine speeds. Such low battery voltage can result in inadequate activation or energization of the spark plugs and can cause engine misfiring. Conversely, a relatively high voltage from the battery results in excessive electrical energy supplied to the primary coil of the transformer and wastes electrical energy.

A still further disadvantage of many of these previously known electronic ignition systems is that the spark advance is automatically varied by the ignition system as a function of engine speed. In many applications, such as aircraft engines, it is highly desirable to enable the operator to manually control the spark advance for the engine. While this is easily accomplished with mechanical distributor systems by merely rotating the distributor housing, the previously known electronic ignition systems have not included any means for allowing the operator to manually set the spark advance.

SUMMARY OF THE PRESENT INVENTION

The present invention provides an electronic ignition system which overcomes all of the above mentioned disadvantages of the previously known systems.

In brief, the electronic ignition system of the present invention comprises a computer, preferably a microprocessor, which receives input signals representative of both the engine speed and the rotational position of the engine crank shaft. Unlike the previously known systems, however, the microprocessor also receives input signals representative of the voltage level of the power supply for battery as well as an input signal representative of the spark advance selected by the operator.

Based on its input signals, the microprocessor generates an output dwell signal which, through a predriver circuit and driver circuit electrically connects the primary coil of the ignition transformer to a power source through an electronic switch in the driven circuit. For a multiple cylinder engine, the microprocessor generates multiple dwell output signals in order to fire the spark plugs in the cylinders in their proper firing sequence.

Unlike the previously known electronic ignition systems, however, the microprocessor activates its dwell output signals for a predetermined period of time prior to the desired fuel ignition independently of the engine speed. In this fashion, the amount of electrical energy supplied to the primary coil fo the ignition transformer remains constant thereby eliminating the previously known waste of electrical energy as with the previously known systems which utilize only the rotational position of the crank shaft to determine the beginning of the dwell period.

The microprocessor also periodically inputs a signal which is representative of the voltage of the battery. Based on this input, the microprocessor reduces the predetermined period as the voltage increases and increases the predetermined time period as the voltage decreases thereby obtaining a substantially constant amount of electrical energy to the primary coil despite voltage fluctuations of the battery.

The microprocessor also periodically inputs a signal representative of the spark advance which is selected by the engine operator. Based on this input, the microprocessor adjusts the beginning of the dwell output signal with respect to the crank shaft rotational position while maintaining the duration of the dwell output signal constant.

BRIEF DESCRIPTION OF THE DRAWING

A better understanding of the present invention will be had upon reference to the following detailed description when read in conjunction with the accompanying drawing wherein like reference characters refer to like parts throughout the several views, and in which:

FIG. 7 is a flow chart illustrating a further portion of the operation of the present invention.

DETAILED DESCRIPTION OF A PREFERRED EMBODIMENT OF THE PRESENT INVENTION

The ignition system of the present invention will be described for use in conjunction with a six cylinder opposed piston internal combustion engine. The engine thus includes six cylinders in three banks, each cylinder having a piston reciprocally mounted within it and connected to a crank shaft by a conventional connecting rod. Each cylinder further includes one and preferably two spark plugs for igniting a combustible mixture within the cylinder in the conventional fashion and both pistons in each bank reach top dead center at the same time. However, while the ignition system of the present invention will be described for use with a six cylinder opposed piston internal combustion engine, the ignition system of the present invention can be easily adapted to other types of internal combustion engines without deviation from the spirit or scope of the present invention.

Figure 2:
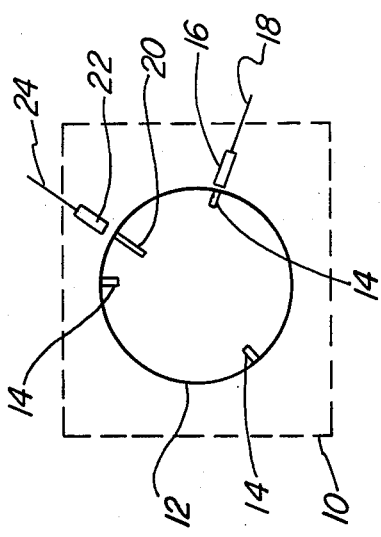
FIG. 2 is a diagrammatic view illustrating a portion of the ignition system of the present invention.

With reference then first to FIG. 2, a six cylinder opposed piston internal combustion engine 10 is there illustrated diagrammatically as having a crank shaft 12 which is rotatably driven by the engine pistons (not shown). Three indicators 14, for example magnets, are secured to the crank shaft 12 so that the indicators 14 are circumferentially equally spaced from each other and thus are spaced 120° apart from each other and so that one indicator 14 is associated with each engine bank. The presence of each indicator 14 is detected by a sensor or transducer 16 as the indicators 14 pass the transducer 16 during rotation of the crank shaft 12. Both the indicators 14 and transducer 16 are conventional in construction and the transducer 16 generates a sinusoidal signal on its output 18 having a frequency directly proportional to the rotational speed of the crank shaft 12. Furthermore, the indicators 14 and sensor 16 are preferably positioned so that each indicator 14 is aligned with the sensor 16 at a predetermined angle, e.g. 35°, before the pistons in its associated bank reach their top dead center position.

Similarly, a further indicator 20 is also secured to the crank shaft 12 and its position is detected by a further sensor or transducer 22 which generates a signal on its output 24 as the indicator 20 passes by the sensor 22 during rotation of the crank shaft 12. Consequently, the signal on the sensor output 24 represents a predetermined crank angle or rotational position of the crank shaft such as top dead center position for one piston.

Figure 1:
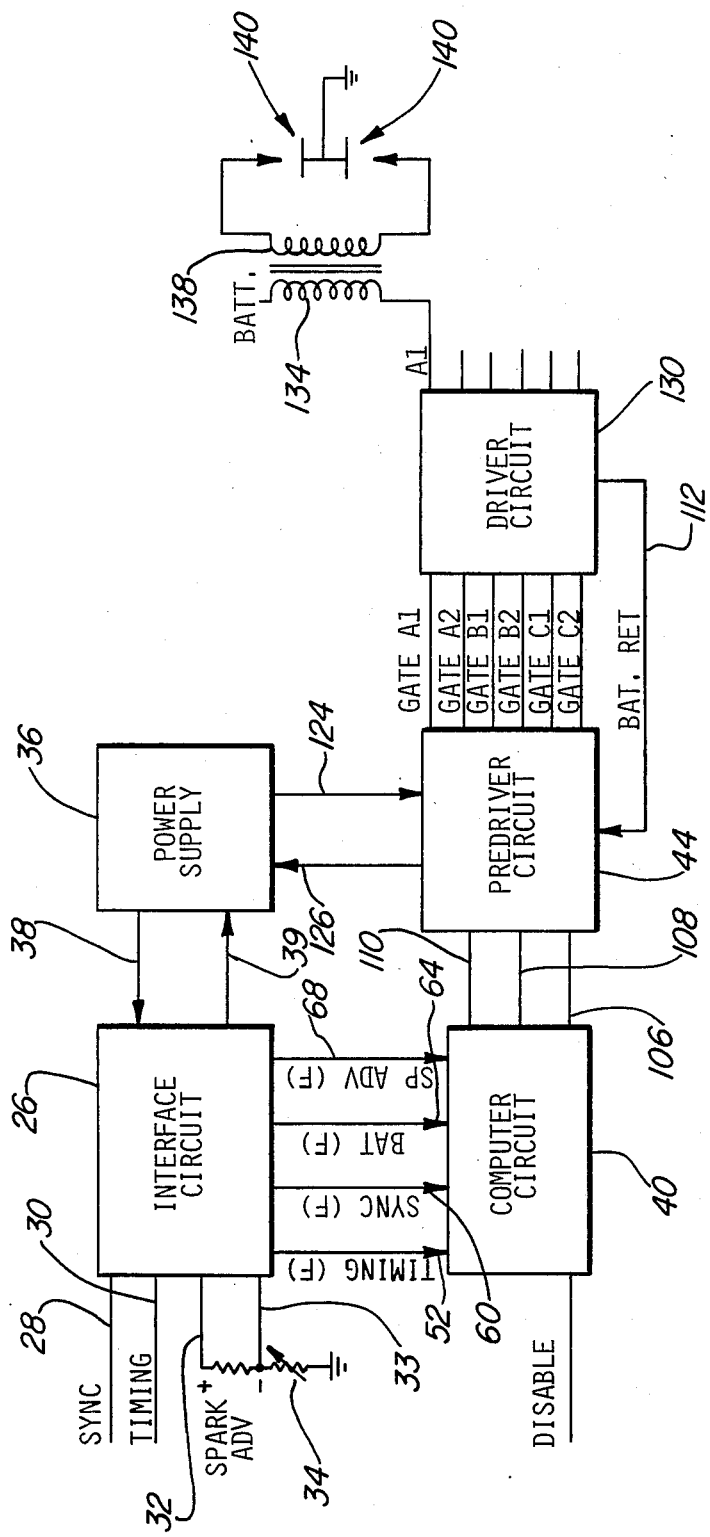
FIG. 1 is a block diagrammatic view illustrating a preferred embodiment of the present invention.

With reference then to FIG. 1, the ignition system of the present invention comprises an interface circuit 26 having a first SYNC input 28 which is electrically connected to the sensor output 24. Similarly, a TIMING input 30 to the interface circuit 26 is electrically connected to the sensor output 18. Consequently, the frequency of the signal on the TIMING input 30 is representative of the engine speed while the signal on the SYNC input 28 is representative of the rotational position of the crank shaft.

A SPARK ADVANCE signal also forms two inputs 32 and 33 to the interface circuit 26 but, unlike the SYNC and TIMING inputs 28 and 30, respectively, the SPARK ADVANCE inputs 32 and 33 are a DC voltage level which can be manually adjusted by the engine operator. Any conventional means, such as a potentiometer 34, can be used to vary the voltage level between the spark advance inputs 32 and 33.

Still referring to FIG. 1, a power supply 36 provides a BATTERY VOLTAGE signal on an output 38 to the interface circuit 26 as well as a battery return or ground line 39 between the interface circuit 26 and the power supply 36. The BATTERY VOLTAGE signal on line 38 represents the voltage of the power source (usually a battery) utilized to fire the engine spark plugs in a fashion to be subsequently described. The voltage output on the line 38, however, is not required to be constant but, rather, can vary between an upper limit, such as 32 volts, and a lower limit, such as 18 volts, without adversely affecting the operation of the ignition system in a fashion to be subsequently described.

The power supply 36 also supplies operating voltages to the various circuits of the ignition system in any conventional fashion. Furthermore, the power supply 36 is conventional in construction and, for that reason, will not be further described.

Figure 3:
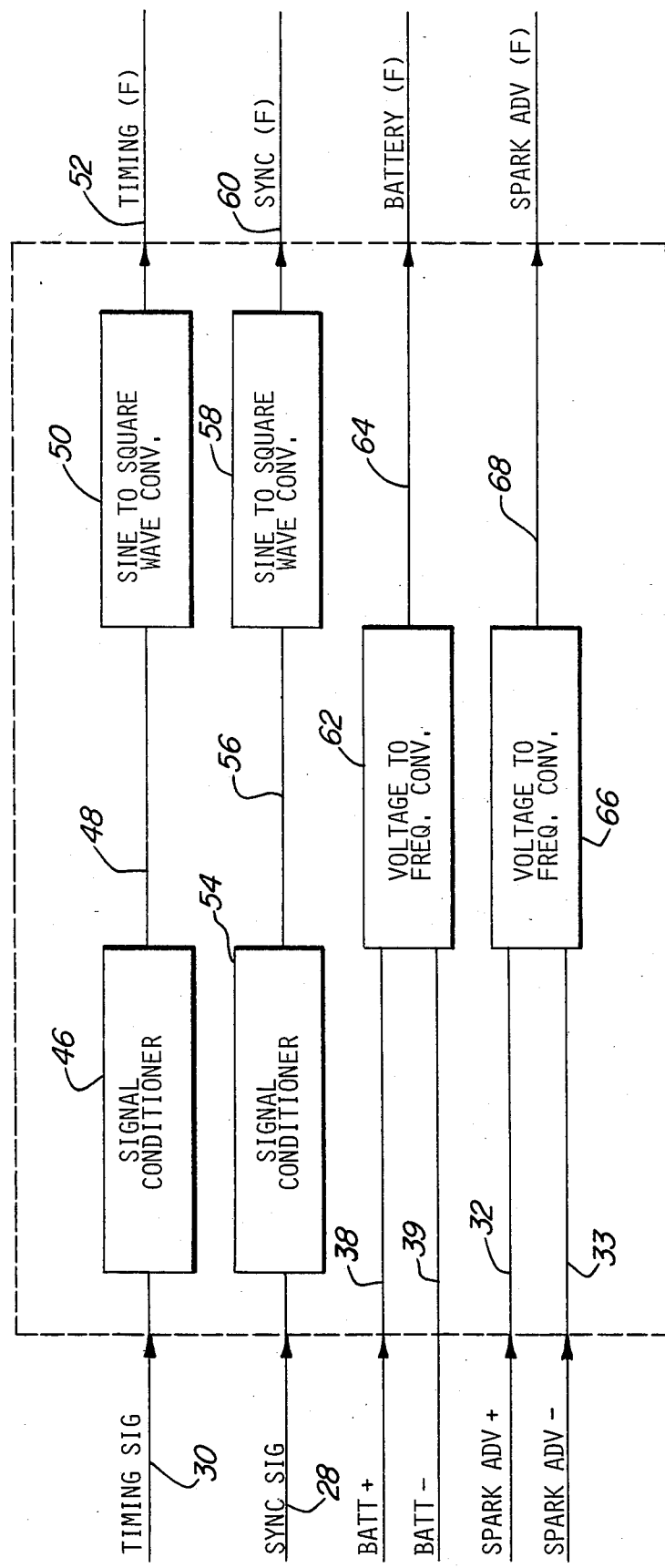
FIG. 3 is a block diagrammatic view illustrating a portion of the preferred embodiment of the present invention.

Referring now to FIG. 3, the interface circuit 26 is thereshown in greater detail and is used to condition the various inputs to the interface circuit 26. In particular, the TIMING signal on input line 30 to the interface circuit 26 generally comprises a sinusoidal wave containing ripple and noise. This input 30 is fed as an input to a signal conditioner 46 which removes ripple and noise from the timing signal 30 thereby producing a clean sinusoidal wave on its output 48. This output 48 is fed as an input signal to a sine to square wave converter 50 which converts the sinusoidal wave to a square wave on the converter output 52. The square wave signal (TIMING (F)) on the output 52 has a frequency directly proportional to the rotational speed of the crankshaft 12 and its signal is fed as an output from the interface circuit 26.

Similarly, the SYNC signal on the input line 28 to the interface circuit 26 is coupled as an input signal to a further signal conditional 54 which removes any noise and/or ripple which may be present on the SYNC input signal 28. An output 56 from the signal conditioner 54 is fed as an input to a sine to square wave converter 58 thereby producing a square wave signal SYNC (F) on output 60 from the interface board 26. Since only one output pulse is generated on the SYNC (F) output 60 from the interface circuit 26 per revolution of the crankshaft 12, the SYNC (F) signal is representative of the rotational position of the crank shaft 12.

Still referring to FIG. 3, the BATTERY signal on an input line 38, as well as the battery return 39 between the interface circuit 26 and the power supply 36, is coupled as an input signal to a voltage to frequency converter 62. The voltage to frequency converter 62, which is conventional in construction, generates a square wave signal on its output 64 having a frequency which is proportional to the voltage level between the battery input lines 38 and 39. This output 64 forms a BATTERY (F) signal from the interface circuit 26.

Similarly, the SPARK ADVANCE inputs on lines 32 and 33 form input signals to a further voltage to frequency converter 66 which generates a square wave signal on its output 68 having a frequency directly proportional to the voltage differential between the interface inputs 32 and 33. The output 68 from the voltage to frequency converter 66 forms the SPARK ADVANCE (F) signal from the interface circuit 26.

Figure 5:
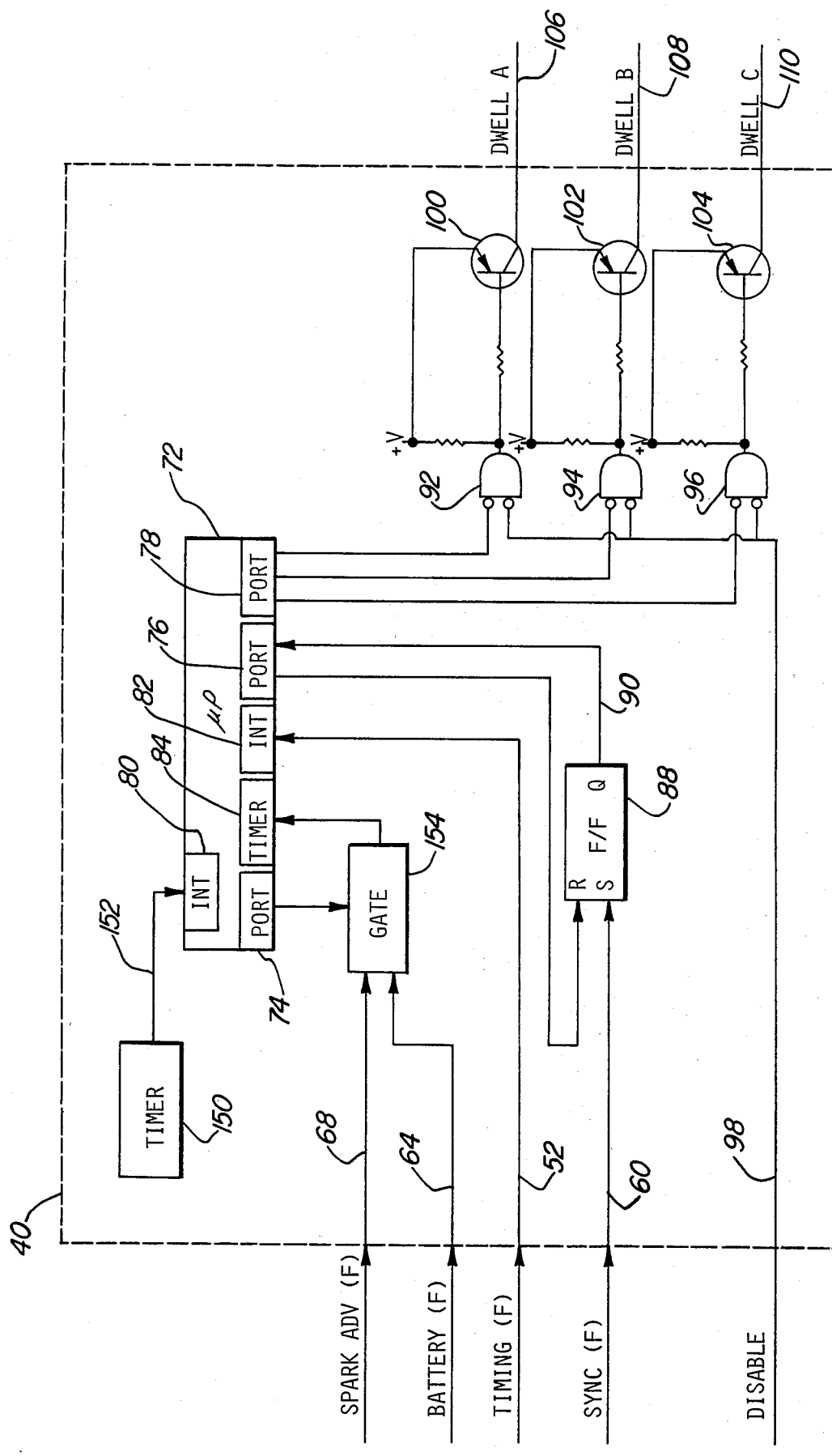
FIG. 5 is a schematic view illustrating a further portion of the preferred embodiment of the present invention.

With reference now to FIGS. 1 and 5, the outputs 52, 60, 64 and 68 from the interface circuit 26 form input signals to a computer circuit 40 which is shown in greater detail in FIG. 5. The computer circuit 40 preferably includes a microprocessor 72 such as an 8751 microprocessor. The 8751 microprocessor 72 includes I/O ports 74, 76, and 78, interrupt input lines 80 and 82 and a timer input 84. The microprocessor 72 also includes read only memory which contains a program which controls the operation of the microprocessor 72. It will be understood, of course, that other types of microprocessors having different configurations of input and output signal connections as well as internal or external memory may be employed without deviation from the spirit or scope of the invention.

Still referring to FIG. 5, the TIMING (F) signal input 52 from the interface circuit 26 forms an output signal to one microprocessor interrupt input 82. Since the engine 10 (FIG. 2) is a six cylinder, four cycle opposed piston engine, there are three fuel ignitions per revolution of the crank shaft 12. In addition, as previously described, the indicators 14 (FIG. 2) on the crank shaft 12 are preferably positioned a predetermined crank angle before top dead center of the piston, for example 35 degrees BTDC. Consequently, one spark plug will be activated or fired in a fashion to be shortly described for each timing signal pulse received on the input line 52 by the microprocessor interrupt 82.

The SYNC (F) signal input 60 to the microprocessor 40 is coupled as an input line to the set input of an RS flip flop 88. The output line 90 from the RS flip flop 88 is fed as an input signal to one input line of the microprocessor port 76 while a different output line from the port 76 forms an output signal to the reset input of the flip flop 88. Consequently, the TIMING (F) signal on the input line 52 together with the SYNC (F) signal on input line 60 to the computer circuit 40 determines which spark plugs will be activated.

Three output lines from the microprocessor output port 78 form input signals to three NAND gates 92, 94 and 96, respectively. The other input of the NAND gates 92, 94 and 96 are connected to a DISABLE input 98 which, when active, disables the NAND gages 92, 94 and 96 and thus disables the entire electronic ignition system. For the purpose of this description, however, it will be assumed that the DISABLE input 98 is inactive so that the ignition system is enabled.

The NAND gates 92, 94 and 96 have their outputs connected to the bases of transistor switches 100, 102 and 104, respectively, so that, when the NAND gates 92, 94 and 96 are active, their associated transistors 100, 102 and 104 are switched on. The outputs or collectors 106, 108 and 110 from the transistors 100, 102 and 104 respectively form three output signals, namely DWELL A, DWELL B and DWELL C from the computer circuit 40. As will become shortly apparent, the DWELL A signal, when active, fires the spark plugs in one opposed piston cylinder bank, the output DWELL B fires the spark plugs in a second opposed piston cylinder bank while the output signal DWELL C fires the remaining two spark plugs in the final opposed piston cylinder bank. Furthermore, since the circuitry for activating the spark plugs for the first bank when the DWELL A signal 106 is active is identical to the circuitry for the DWELL B signal and DWELL C signal only the DWELL A signal and its circuitry will be described in detail, it being understood that a like description shall also apply to the other cylinder banks.

Figure 4:
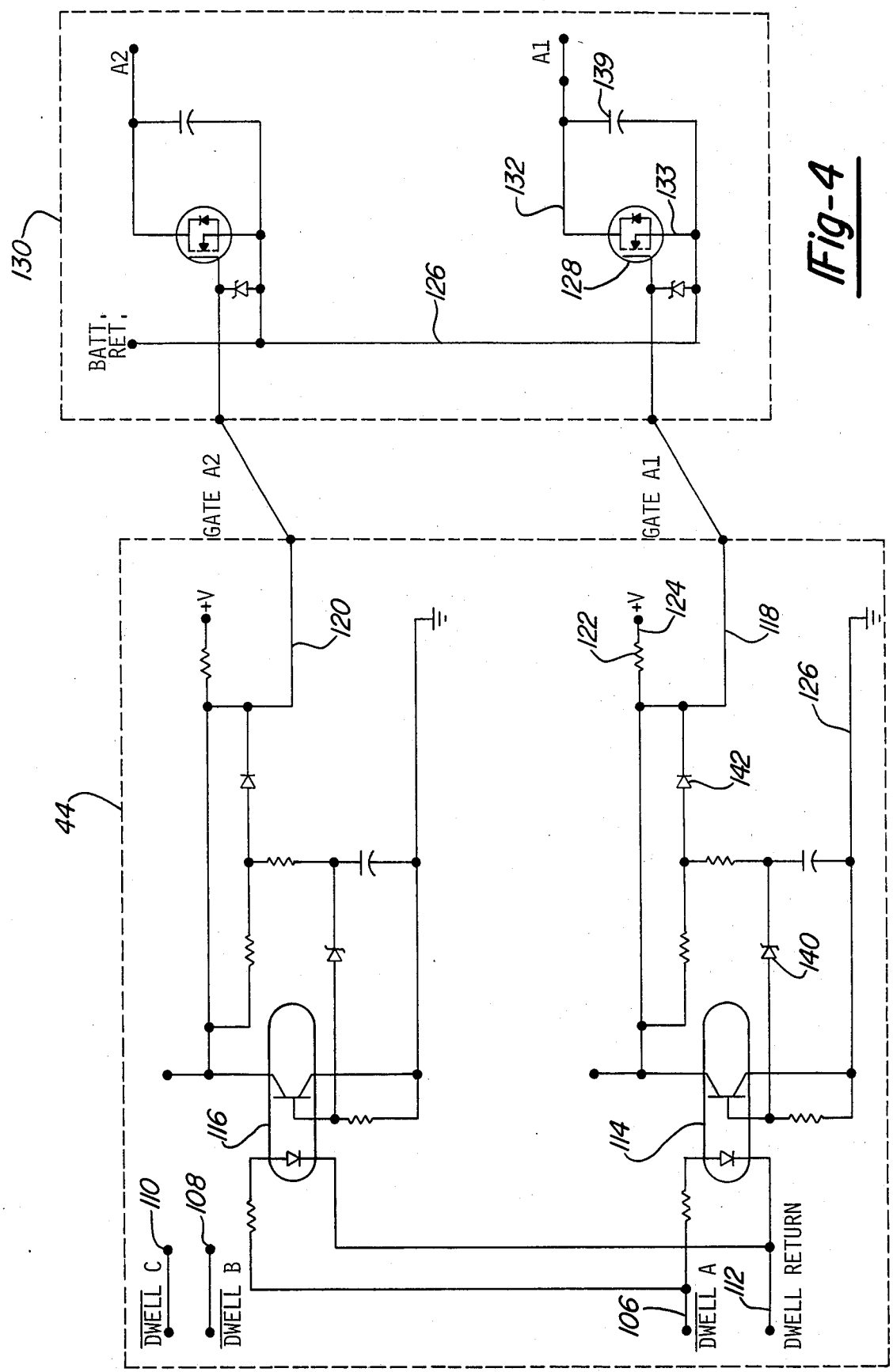
FIG. 4 is a schematic view illustrating a portion of the preferred embodiment of the present invention.

With reference then to FIGS. 1 and 4, the DWELL A signal 106, DWELL B signal 108 and DWELL C signal 110 form input signals to the predriver circuit 44 while a battery return 112 is connected between the computer circuit 40 and the predriver circuit 44. The DWELL A signal 106 is connected as an input signal to a pair of optically isolated transistors 114 and 116 which produce output signals on their output lines GATE A1 118 and GATE A2 120, respectively. The dual transistors 114 and 116 are purely redundant and are provided to ensure continued operation of the ignition system despite failure of one of the transistors 114 or 116. Consequently, only the circuitry associated with the transistor 114 will be described in detail, it being understood that a like description shall also apply to the transistor 116. The circuitry (not shown) for the DWELL B signal 108 and DWELL C signal 110 in the predriver circuit 44 also includes identical redundant circuits.

The collector of the optically isolated transistor 114 is coupled through a limiting resistor 122 to a power input 124 extending between the power supply 36 (FIG. 1) and the predriver circuit 44. Similarly, the emitter of the transistor 114 is electrically connected to a battery return line or ground 126 also extending between the predriver circuit 44 and the power supply 36. The GATE A1 signal 118, i.e. the output line from the predriver circuit 44, is directly connected to the collector for the transistor 114.

The GATE A1 output 118 is connected to the gate input of a field effect transistor (FET) 128 on a driver circuit 130 (see also FIG. 1). The source 132 of the FET 128 is connected to one end of the primary coil 134 of an ignition transformer while the other end of the primary coil 134 is connected to the power supply battery. The drain 133 for the FET 128 is connected to the battery return 126.

Referring now particularly to FIG. 4, in operation, when the DWELL A input 106 goes high, indicative of the beginning of the DWELL period prior to activation of the spark plug, the optically isolated resistor 114 turns off thus opening the connection between the power supply line 124 and its return 126. When this happens, the current flow through the resistor 122 is terminated so that the resistor 122 forms a pull up resistor which drives the gate of the FET 128 high. When this occurs, the FET 128 conducts and thus electrically connects one end of the ignition primary coil 134 to the battery return line 126 thereby allowing current to flow into the coil 134.

Conversely, when the DWELL A signal 106 goes low, the transistor 114 switches on thus electrically connecting the resistor 122 to ground 126. When this occurs, the gate to the FET 128 goes low thus terminating current flow between the source 132 and drain 133 of the FET 128 and electrically disconnects the primary coil 134 from the battery return 126.

As best shown in FIG. 1, the primary coil 134 is inductively coupled to a secondary coil 138 having its ends electrically connected to spark plugs 140 (illustrated only diagrammatically). The primary coil 134 thus stores electrical energy when electrically connected to battery power when the FET 128 conducts. Upon interruption of the current flow into the primary coil 134, the primary coil 134 discharges its stored electrical energy through the secondary coil 138 and to the spark plugs 140, thus activating the spark plugs 140. In addition, the dual spark plugs 14 for each secondary coil 138 are again redundant to ensure continued operation of the ignition system in the event of failure or fouling of one or more spark plugs 140.

With reference again to FIG. 4, a capacitor 139 is preferably electrically connected between the source 132 and drain 133 of the FET 128 in order to protect the FET 128 from high transient currents in the event of failure of the spark plug 140. Similarly, clamping diodes 140 and 142 protect the optically isolated transistor 114 from high voltage transients.

Figure 6:
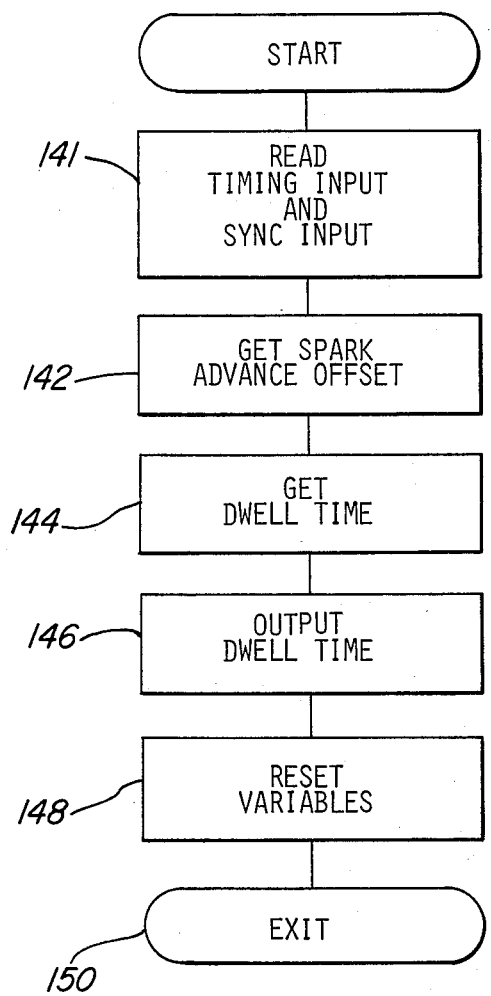
FIG. 6 is a flow chart illustrating a portion of the operation of the present invention.

With reference now to FIGS. 1, 5 and 6, from the foregoing it can be seen that the primary coil 134 of the ignition transformer is electrically connected to the battery and thus receives the source of electrical energy only when the DWELL A signal 106 from the computer circuit 40 becomes active. Conversely, when the DWELL A signal becomes inactive, the current flow to the primary coil 134 is interrupted thus firing the spark plug 140 in the desired fashion. For this reason, the duration of the output signal DWELL A 106 from the computer circuit 40 controls the amount of electrical energy supplied to the primary coil 134 during each spark ignition.

With reference then to FIGS. 5 and 6, unlike the previously known systems, the microprocessor 72 is programmed to provide a signal on the computer circuit outputs 106, 108 and 110 which are of a duration independent of the crank shaft angle or position and, thus, independent of engine speed. Consequently, the duration of the output signals from the computer circuit 40 remains the same regardless of engine speed so that the same amount of electrical energy is received by the coils 134 regardless of engine speed.

An exemplary computer program is illustrated in FIG. 6 to control the firing of the spark plugs 140. At step 141 (FIG. 6) the microprocessor 72 reads the TIMING (F) input from line 52 as well as the SYNC (F) input from line 60. Step 141 thus determines which spark plugs will be activated upon receipt of the timing signal on the microprocessor interrupt 82.

At step 142, the microprocessor determines the spark advance offset which is manually set by the engine operator and which will be discussed more fully below. The spark advance offset determined at step 142, however, does not effect the duration of the output signals on lines 106, 108 or 110 from the computer circuit 40 but rather merely determines the initiation of the output signal from the computer circuit 40 or dwell period with respect to the rotational position of the crank shaft 12.

At step 144 the microprocessor 72 determines the dwell time which is the length or duration of the signal output on the computer output lines 106, 108 or 110. This dwell time is independent of engine speed but, as subsequently discussed, does vary as a function of the battery voltage.

At step 146, the microprocessor 72 generates an output signal from its port 78 in order to activate one of its output lines 106, 108 or 110 for the duration of the dwell time as determined in step 144.

At step 148, the microprocessor 72 resets its variables and then exits at step 150 until the next interrupt is received from the TIMING (F) signal input 52 to the microprocessor 72. Step 148 also keeps track of which cylinder bank has been fired as well as the next cylinder bank to be fired.

With reference now to FIG. 5, the microprocessor 72 is programmed to vary the duration of the output signals on lines 106, 108 and 110 from the computer circuit 40 as a function of the battery voltage. To accomplish this, the computer circuit 40 includes a timer 150 which periodically generates a signal on its output 152 to the second interrupt input 80 for the microprocessor 72.

When this occurs the microprocessor 72 generates an output signal from its port 74 to a gate 154 which selectively gates the spark advance frequency from line 68 or the battery voltage frequency from line 64 to the timer input 84 of the microprocessor 72.

With reference to FIG. 7, FIG. 7 represents an exemplary routine for interrogating or reading both the spark advance signal on input line 68 and battery voltage 68 on line 64 to the computer circuit 40. At step 156, the microprocessor increments an interrupt counter which determines whether the spark advance signal on line 68 will be interrogated or the battery voltage signal on line 64 will be interrogated during execution of the interrupt routine. Preferably, the spark advance signal is inputted by the microprocessor nine times for every time the battery voltage input is read by the microprocessor since changes in battery voltage are typically relatively slow.

At step 158, the microprocessor compares the input count to ten and, if unequal to ten, exits to step 160 which interrogates or reads the spark advance input signal on line 68. Step 160 thus sets the microprocessor output port 74 so that it gates the input signal 68 to the timer input 84. Step 160 then measures the time between adjacent timing pulses to determine the spark advance set by the engine operator.

At step 162, the microprocessor compares the spark advance input signal on line 68 to its previous value and, if unchanged, exits the interrupt routine via step 165. Conversely, if the spark advance signal had changed since the previous interrogation, step 162 exits to step 164 in which the microprocessor calculates a new offset for the initiation of the dwell output signals on its outputs 106, 108 and 110. Step 164 then exits to step 166 which saves the newly determined dwell offset value and then exits via step 165.

Upon the receipt of every tenth interrupt signal from the timer 150 (FIG. 5), step 156 increments the interrupt counter to ten so that step 158 branches to step 168 and resets the interrupt counter to 0. Step 168 then exits to step 170 which interrogates or reads the battery voltage input signal on line 64. During such interrogation, the microprocessor 72 generates an output signal on its port 74 to the gate 154 so that the battery voltage input signal 64 is gated into the microprocessor timer input 84. Step 170 then measures the time between adjacent pulses and this elapsed time is representative of the battery voltage available to charge the primary coils 134 of the ignition transformer.

Step 172 then determines whether the battery voltage has changed from its previous setting and, if not, exits to step 165 thus terminating the interrupt. Conversely, if the battery voltage has changed since its previous setting, step 172 exits to step 176 whereupon the microprocessor 72 calculates a new duration for the dwell time, i.e. the duration of the output signals on the output lines 106, 108 or 110 from the computer circuit 40 as a function of battery voltage. Step 176 then exits to step 178 which saves the newly determined duration for the dwell period and then exits from the interrupt routine via step 165.

Step 176 of the interrupt routine calculates the dwell time to ensure that a substantially constant amount of electrical energy is supplied to the primary coils 134 (FIG. 1) of the ignition transformer despite variations of the battery voltage between an upper and a lower limit. As such, step 176 prevents excessive current draw from the battery in the event of a higher than nominal battery voltage. Conversely, step 176, by lengthening the duration of the dwell output signal in the event of less than nominal battery output, ensures adequate electrical power to the ignition transformer primary coil thereby preventing incomplete combustion caused by low spark current. Any conventional means can be employed by the microprocessor, such as a look up table to determine the proper duration of the dwell output signal as a function of battery voltage.

It will be understood, of course, that the programs illustrated in FIGS. 6 and 7 are simplified and presented by way of example only. Other programs are well within the ordinary skill in the art.

From the foregoing, it can be seen that the present invention provides an electronic ignition system which overcomes many of the disadvantages of the previously known systems. In particular, the ignition system of the present invention maintains a dwell time which is independent of engine speed thereby eliminating the previously known waste of electrical power of the previously known systems which initiate dwell as a function of the crank shaft rotational position or crank angle. The duration of the dwell signal, however, varies as the function of battery power available to energize the primary coil of the ignition transformer thus ensuring against high current drains in the event of higher than nominal bettery power as well as ensuring an adequate supply of electrical energy in the event of less than nominal available battery power.

Having described my invention, however many modifications thereto will become apparent to those skilled in the art to which it pertains without deviation from the spirit of the invention as defined by the scope of the appended claims.

I claim:

1. An ignition system for a spark ignition combustion engine having a rotatable driven output shaft comprising:
   means for sensing the rotational position and speed of said shaft and for generating output signals, representative thereof,
   at least one spark plug,
   means for cyclically activating said spark plug in synchronism with the rotation of said shaft comprising:
   a source of electrical energy, means for storing electrical energy, switch means responsive to said sensing means for electrically connecting said source of electrical energy to said storing means for a predetermined period of time regardless of the rotational speed of said shaft and for thereafter discharging the energy stored in said storing means to said spark plug at a preselected rotational position of said shaft,
   means for manually varying said rotational position at which said spark plug is energized by a user selected value, said manual varying means generating a spark advance output signal representative of the user selected value,
   wherein the voltage of said source of electrical energy varies between an upper limit and a lower limit, and comprising means responsive to the voltage of said source of electrical energy for varying the duration of said predetermined time period inversely with respect to the voltage of said electrical source and for generating a voltage output signal representative of the voltage of the electrical source, a computer having a data input and program means for periodically reading either of said voltage output signal or said spark advance output signal on said data input at predetermined time intervals.

2. The invention as defined in claim 1 wherein said energy storing means comprises a transformer having a primary coil and a secondary coil, said secondary coil having one end connected to said spark plug, one end of said primary coil being connected to said source of electrical energy, and wherein the other end of said primary coil is electrically connected to an electrical voltage reference different than said electrical energy source during said predetermined period.

3. The invention as defined in claim 2 wherein said switch means comprises a field effect transistor having a gate, a source and a drain, said field effect transistor having its source connected to said primary coil and its drain connected to said other voltage reference.

4. The invention as defined in claim 3 and comprising an optically isolated transistor electrically connected to the gate of the field effect transistor for switching said field effect transistor between a conducting and a non-conducting state between said source and said drain.

5. The invention as defined in claim 1 wherein said voltage output signal generating means comprises means for generating a pulse signal having a frequency proportional to voltage.

6. The invention as defined in claim 1 wherein said computer includes an interrupt output and wherein said duration varying means comprises means for periodically connecting an input signal to said interrupt input, said computer including program means responsive to the receipt of a signal on said interrupt input for reading said digital voltage signal.

* * * * *